V. G. APPLE.
ELECTRIC STARTING SYSTEM FOR INTERNAL COMBUSTION ENGINES.
APPLICATION FILED NOV. 19, 1914.
1,196,636.
Patented Aug. 29, 1916.
2 SHEETS—SHEET 1.
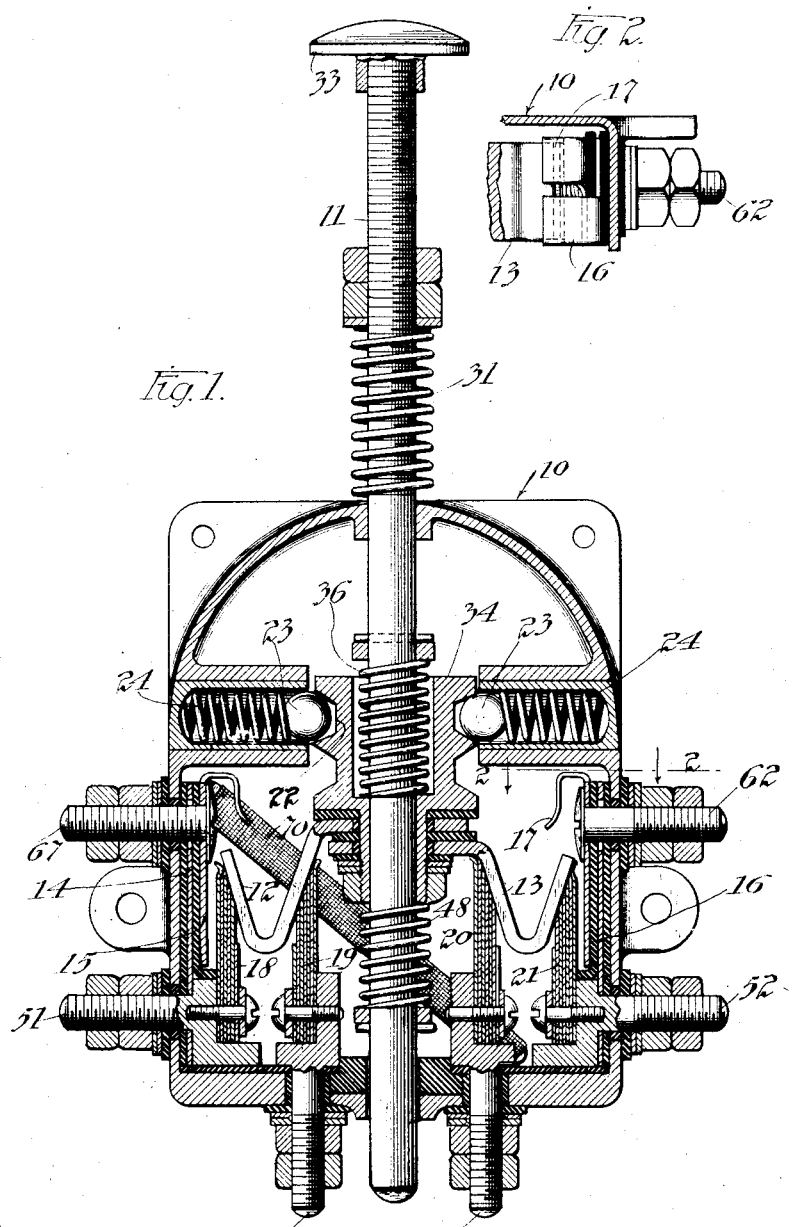

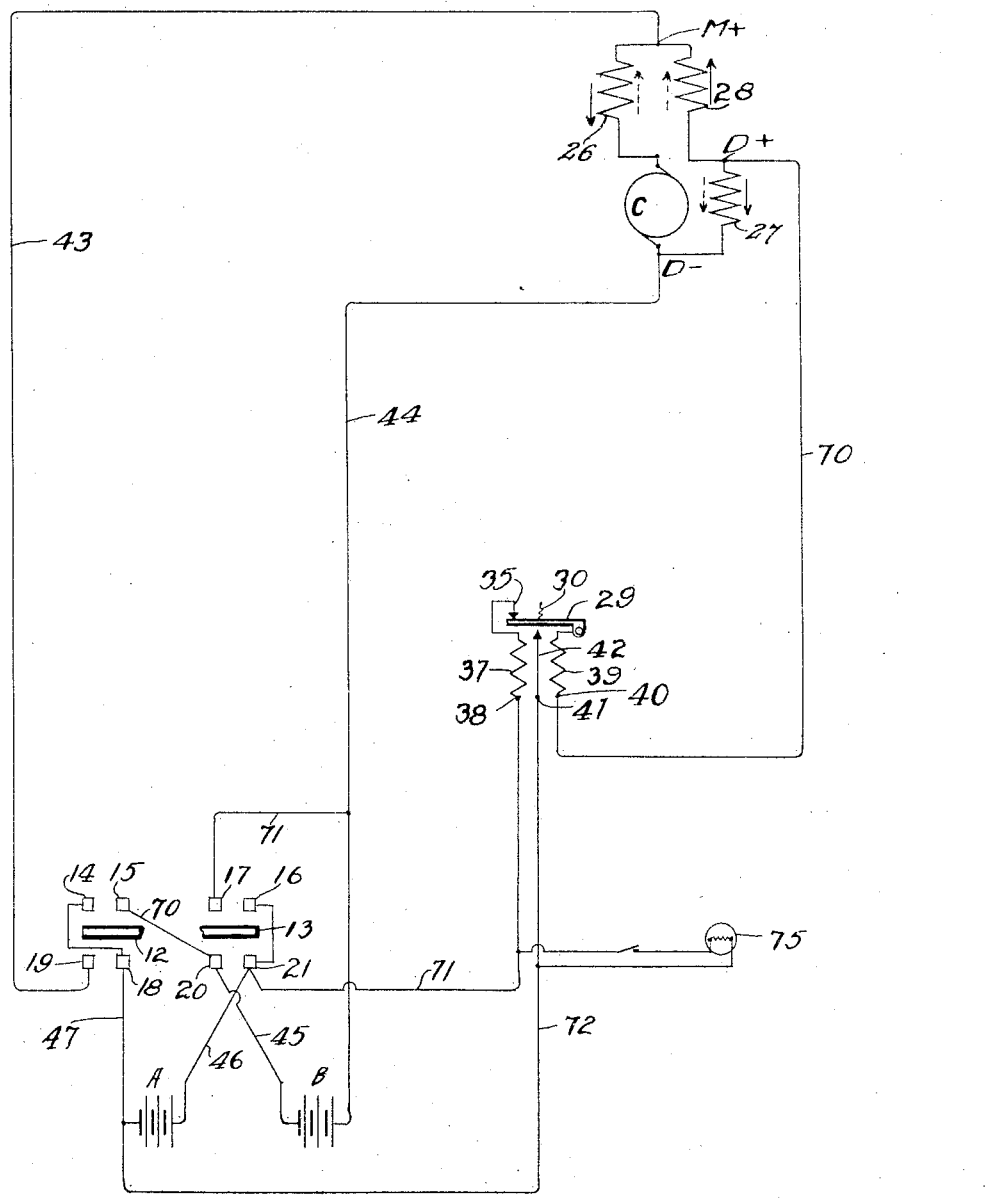

UNITED STATES PATENT OFFICE.

VINCENT G. APPLE, OF DAYTON, OHIO.

ELECTRIC STARTING SYSTEM FOR INTERNAL-COMBUSTION ENGINES.

1,196,636.   Specification of Letters Patent.   Patented Aug. 29, 1916.

Application filed November 19, 1914. Serial No. 872,957.

*To all whom it may concern:*

Be it known that I, VINCENT G. APPLE, a citizen of the United States, residing at Dayton, in the county of Montgomery and State of Ohio, have invented certain new and useful Improvements in Electric Starting Systems for Internal-Combustion Engines, of which the following is a specification.

This invention relates to improvements in electrical systems for gas engine starting apparatus, and more particularly to a system for use in connection with a dynamo adapted to serve either as a motor or as a generator.

One of the objects of my invention is to provide a simple and efficient system eliminating, in so far as expedient, dependence upon automatic, complicated, and troublesome apparatus, such as heretofore has been considered desirable in installations of this nature.

Another object of my invention is to provide a system in which a single switch, manually operable, connects a dynamo with a set of batteries in series so as to give the dynamo the total voltage produced by the batteries and, on the switch assuming its normal and spring held position, connecting the dynamo with the batteries in parallel so as to charge them at a six volt rate.

Still another object of my invention is the provision of a system in which a dynamo having a series field winding, a shunt field winding and a field bucking winding, when operating as a motor has its field bucking winding cut out of circuit and when operating as a generator has its series field winding and field bucking winding in series with each other and the armature, both magnetically opposing the field created by the shunt field winding thus holding down the charging current when an increase in armature speed tends to raise it above a predetermined value.

Other and further objects will become apparent to those skilled in the art from a consideration of the following description and drawings, wherein:—

Figure 1 is a vertical, longitudinal sectional view through a switch particularly adapted for my improved system. Fig. 2 is a fragmentary horizontal sectional view on the line 2—2 of Fig. 1, and; Fig. 3 is a diagram illustrating the connections for my improved system.

In the drawings I have illustrated as particularly applicable to this system a form of switch which is illustrated and described in a copending application entitled, Switches, filed November 19, 1914, by William M. S. Miller and myself and serially numbered 872,933. Whereas other forms of switches might be applicable to this system, the particular type of switch illustrated and described in the aforesaid application, provided as it is with eight contacts, performs the desired functions in an efficient manner with a positive and quick action.

Referring more particularly to Figs. 1 and 2, it will be noted that this switch comprises in general a casing indicated by the numeral 10 in which reciprocates a plunger 11, normally spring held in its uppermost position by a coil spring 31. A button 33 is carried on the upper end of the plunger and the switch is mounted so as to place this button within easy reach of the operator of the car. A thimble 34 is slidably mounted on the reciprocating plunger 11 and is resiliently connected therewith by means of a pair of opposed coil springs 36 and 48. V-shaped switch blades 12 and 13 are carried on the resiliently mounted thimble 34 which is latched in either of its extreme positions by means of the spring pressed balls 23, engaging with the notches 22 in the thimble holding the same in its last assumed position, until the pressure of one or the other of the opposing springs overcomes the pressure of the ball engaging springs 24 and forces the thimble into its new position with a quick positive action. When the thimble 34 is in its uppermost position the blade 12 engages and bridges over the two fingers on the ends of the strips 14 and 15, blade 13 engaging and bridging over the fingers on the ends of the strips 16 and 17. Strip 17 is connected with binding post 62 and strip 16 with binding post 52. The strip 14 is connected with binding post 51 and strip 15 is connected with binding post 67. A metal strip 70 connects post 67 with post 59. When the switch is thrown into its lower position, the V-shaped blade 12 engages with contacts 18 and 19, the former carried by binding post 51 and the latter by binding post 58. On the other side of the plunger the V shaped blade engages with contacts 20 and 21, carried by binding posts 59 and 52 respectively.

Referring to the wiring diagram shown in Fig. 3, I have illustrated the contacts 14 and 15, 16, 17, 18, 19 and 20, 21 as laid out in a single plane to simplify somewhat the illustration of the connections. The blades 12 and 13 are diagrammatically illustrated as straight blades, unconnected, but movable vertically into connection with either the upper or the lower contacts.

Two storage batteries A and B are provided for furnishing current at 12 volts when connected in series with each other for operating the dynamo as a motor to start a gas engine, or connectible in parallel with each other when the dynamo operates as a generator for charging at six volts. The dynamo illustrated comprises the armature C, a series field winding 26, one end of which is connected to the positive brush of the armature and the other end connected with terminal M+. A shunt field winding 27 is connected across the terminals D— and D+, terminal D— being directly connected with negative brush of the armature. Across terminals D+ and M+ is connected a field bucking winding indicated by the numeral 28.

An automatic cut-out having an armature 29 normally held by the spring 30 in its uppermost position in engagement with contact 35 is illustrated diagrammatically. This cut-out preferably takes the form illustrated and described in my Patent No. 1,100,341 issued June 16th, 1914. The shunt coil 37 of the cut out is connected at one end with the contact 35 and at the other end to terminal 38. The series coil 39 is connected at one end with the armature 29 and at its other end with terminal 40, whereas the terminal 41 is connected to a contact 42 adapted to be engaged by the armature when the same is moved against the pressure of the spring 30 into its lower position.

For operating the dynamo as a motor for starting an engine the switch blades 12 and 13 are thrown down into engagement with contacts 18—19 and 20—21. When in this position, switch blade 12 bridges contacts 18, 19 and switch blade 13 bridges contacts 20, 21. Under these conditions the path of the current will be as follows: from the positive side of battery A over wire 47, through switch blade 12, and wire 43, to terminal M+ of the dynamo, returning from terminal D— over wire 44 to the negative side of battery B, thence from the positive side of this battery over wire 45 to switch blade 13 and over wire 46 to the negative side of battery A. The batteries are then connected in series with each other and deliver 12 volts to the motor. Under these conditions the dynamo operates as a compound motor with the series field winding 26 magnetically aiding the field created by shunt field winding. The magnetic field created by the field bucking winding, when the dynamo operates as a motor, though opposing the field created by both the series field winding and shunt field winding is of such small value as to be negligible. When pressure upon the button 33 is released the switch blades 12 and 13 are spring pressed into their uppermost positions into engagement with the contacts 14, 15 and 16, 17, the batteries are then connected in parallel with each other for charging, and the path of the current will be as follows. From the positive side D+ of the dynamo, operating now as a generator, current will flow over wire 70 to terminal 40 of the cut out. It will then pass through the coils 39, 37 out over wire 71 to contact 21 of the switch, this being connected directly with contact 16, over the blade 13 to contact 17 and thence over wires 73 and 44 to the negative side D— of the generator. Current flowing through the coils 39 and 37 of the cut out creates a magnetic field drawing the armature 29 down away from the contact 35 and into engagement with contact 42. From the armature 29 the current will then flow through the contact 42 over wire 72 to wire 47 and thence to the positive side of battery A. The positive side of battery B is connected to this side of the line through wire 45, connector 70, contact 15, blade 12, contact 14, which in turn is connected to contact 18 and wire 47. The return path is from the negative side of battery B over wire 44 directly to the negative terminal D— of the generator. From the negative side of battery A current returns over wire 46 to contact 21 which is connected to contact 16 thence through the switch blade 13 to wire 73 which is connected with the return wire 44. When operating under these conditions with the armature 29 of the cut out in engagement with contact 42 the shunt coil 37 of the cut out is not in circuit. As long as the current flows through the coil 39 in the direction above outlined, the voltage of the generator being greater than that of the battery, this condition will obtain, but should the speed of the generator become reduced and the voltage decrease the reversal of the direction of current flow through series coil 39 will permit the armature 29 to leave contact 42 breaking the circuit and prevent short circuiting the battery. The same operation takes place when the batteries are fully charged.

When operating as a generator the series field winding and field bucking winding both oppose the shunt field winding. Though the magnetic field produced by the shunt field winding predominates, the charging current is prevented from exceeding a predetermined value due to the series field winding and field bucking winding acting as regulators holding down the charging current. In the wiring diagram I have placed arrows adjacent the windings 26, 27 and 28, indicating the direction of the magnetic fields produced in the coils under the different circuit conditions. The solid line arrows indicate motor conditions and the dotted line arrows, generator conditions.

An electric lamp 75 or other translating device may be connected directly across the wires 71 and 72, and is at all times supplied with current at six volts whether the dynamo is operating as a motor or a generator.

Whereas I have illustrated and described a single embodiment of my invention it is obvious that various changes and modifications may be made without departing from the spirit and scope of my invention.

Having described my invention, what I claim is:—

In a system of the character described, the combination of a dynamo adapted to operate either as a generator, or as a motor, said dynamo being provided with a series field winding, a shunt field winding and a field bucking winding; and connections whereby said dynamo when operating as a motor has its shunt field winding and bucking field winding connected in series and in a circuit parallel with the series field winding and armature; and when operating as a generator has its series field winding and field bucking winding in series with each other and with the armature, said shunt field winding being connected in a circuit in parallel to the circuit including the series field winding and armature.

In testimony whereof I hereunto set my hand in the presence of two subscribing witnesses.

VINCENT G. APPLE.

In the presence of—
E. V. MARTIN,
E. KRAUTTER.

Copies of this patent may be obtained for five cents each, by addressing the "Commissioner of Patents, Washington, D. C."